United States Patent [19]
Heidrich et al.

[11] Patent Number: 6,161,373
[45] Date of Patent: Dec. 19, 2000

[54] FLEXIBLE ENERGY CONDUCTING GUIDE CHAIN AND PROCESS FOR PRODUCING SAME

[75] Inventors: Klaus Heidrich; Lorenz Klein, both of Netphen; Herbert Wehler, Neunkirchen; Willibald Weber, Netphen, all of Germany

[73] Assignee: Kabelschlepp GmbH, Siegen, Germany

[21] Appl. No.: 09/380,997

[22] PCT Filed: Mar. 4, 1998

[86] PCT No.: PCT/EP98/01214

§ 371 Date: Sep. 13, 1999

§ 102(e) Date: Sep. 13, 1999

[87] PCT Pub. No.: WO98/40645

PCT Pub. Date: Sep. 17, 1998

[30] Foreign Application Priority Data

Mar. 13, 1997 [DE] Germany ............ 197 10 489

[51] Int. Cl.⁷ ............................................. F16G 13/00
[52] U.S. Cl. ........................... 59/78.1; 59/900; 248/49
[58] Field of Search ............. 59/78.1; 248/49, 248/51, 75

[56] References Cited

U.S. PATENT DOCUMENTS

| | | |
|---|---|---|
| 2,975,807 | 3/1961 | Waninger . |
| 3,473,769 | 10/1969 | James . |
| 4,392,344 | 7/1983 | Gordon . |
| 4,953,735 | 9/1990 | Tisbo . |
| 5,048,283 | 9/1991 | Moritz et al. . |
| 5,322,480 | 6/1994 | Meier et al. . |
| 5,411,443 | 5/1995 | Meier et al. . |

FOREIGN PATENT DOCUMENTS

| | | |
|---|---|---|
| 0 412 233 | 2/1991 | European Pat. Off. . |
| 0 415 050 | 3/1991 | European Pat. Off. . |
| 0 424 404 | 5/1991 | European Pat. Off. . |
| 0 544 027 | 6/1993 | European Pat. Off. . |
| 0 789 167 | 8/1997 | European Pat. Off. . |
| 2 448 240 | 8/1990 | France . |
| 1 131 480 | 12/1962 | Germany . |
| 8213664 U | 8/1982 | Germany ............ 59/78.1 |
| 265 449 | 3/1989 | Germany . |
| 163545 | 6/1990 | Japan ............ 59/78.1 |
| WO 80 02476 | 11/1980 | WIPO . |
| WO 90 00824 | 1/1990 | WIPO . |

*Primary Examiner*—David Jones
*Attorney, Agent, or Firm*—Alston & Bird LLP

[57] ABSTRACT

The present invention concerns a foldable protective element for, in particular movably laid, lines, which is cast or injection-moulded in one piece from plastic material substantially in an approximately level, flat configuration, and has segments (11, 12, 13, 14) which are connected together by bendable bridges (15), wherein the protective element has a bottom segment (11) with a top side (4) and an underside (5), and at least one wall segment (12), which can be shaped to form a closed passage portion (10) by bending and/or folding in the direction of the top side (4) of the bottom segment (11) and mechanical closure of a closing mechanism (16, 17), and wherein the protective element (1) is so connected or connectable to other similar protective elements (2) that the passage portions (10) form in a longitudinal direction (S) a passage for lines. A particularly preferred embodiment is one in which an entire series of protective elements is injection-moulded in one piece, with end portions (30). Complete protective systems for lines can be inexpensively produced in that way.

23 Claims, 9 Drawing Sheets

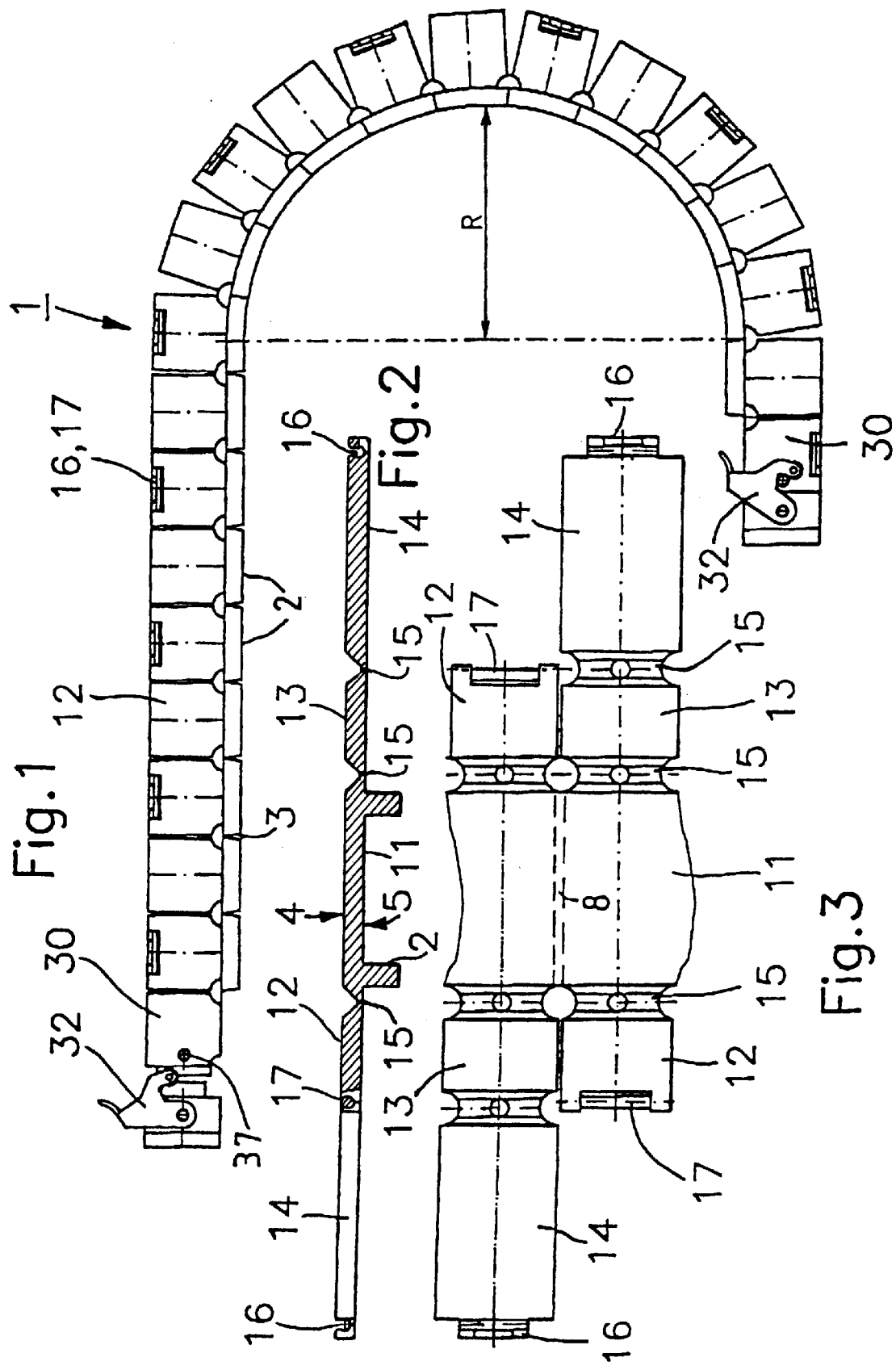

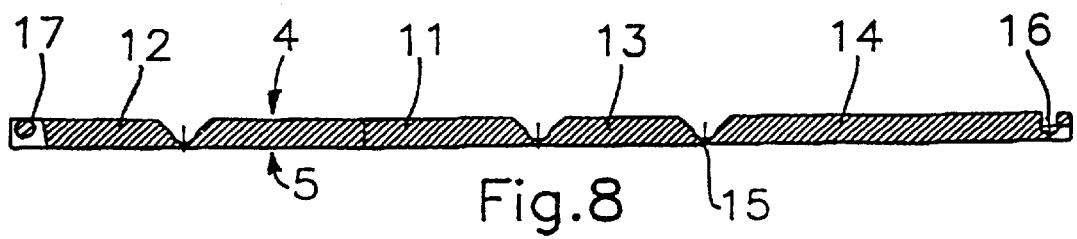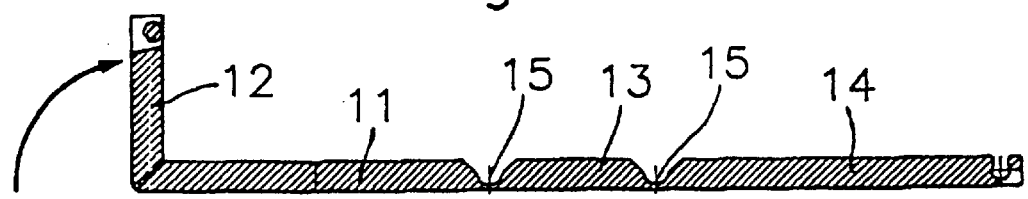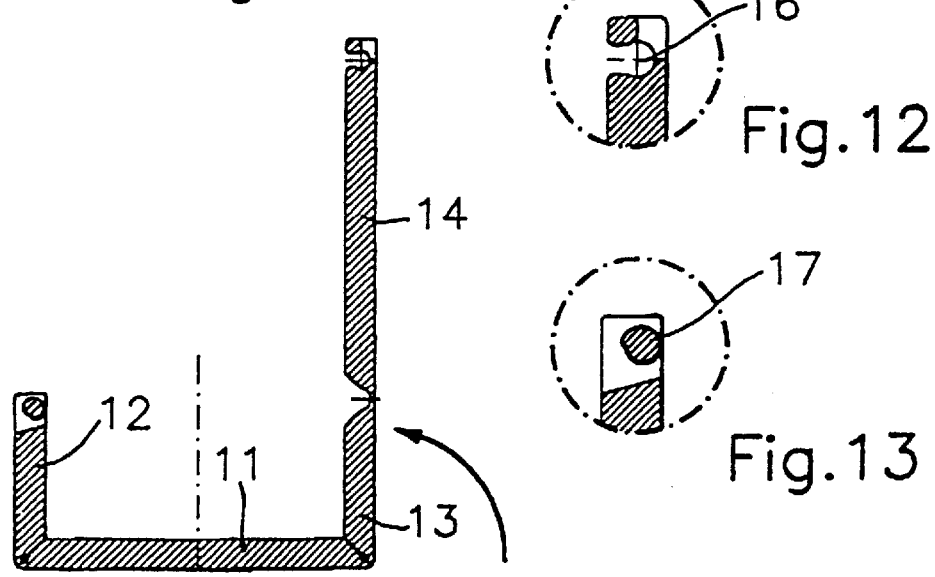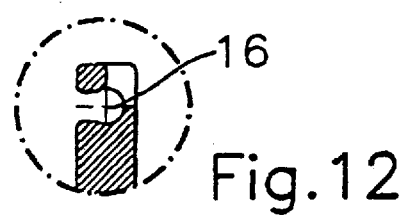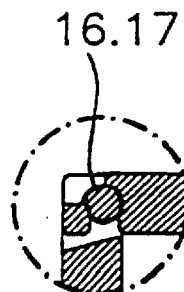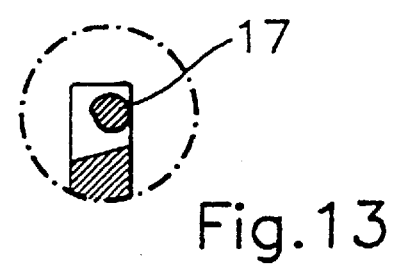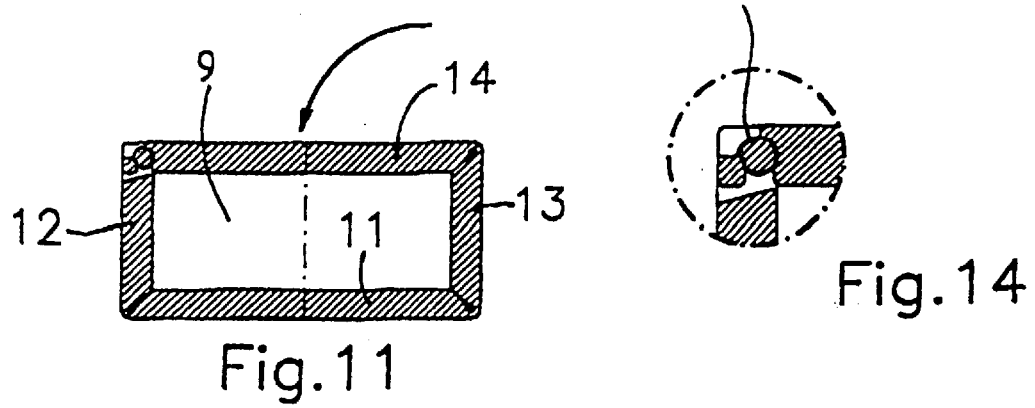

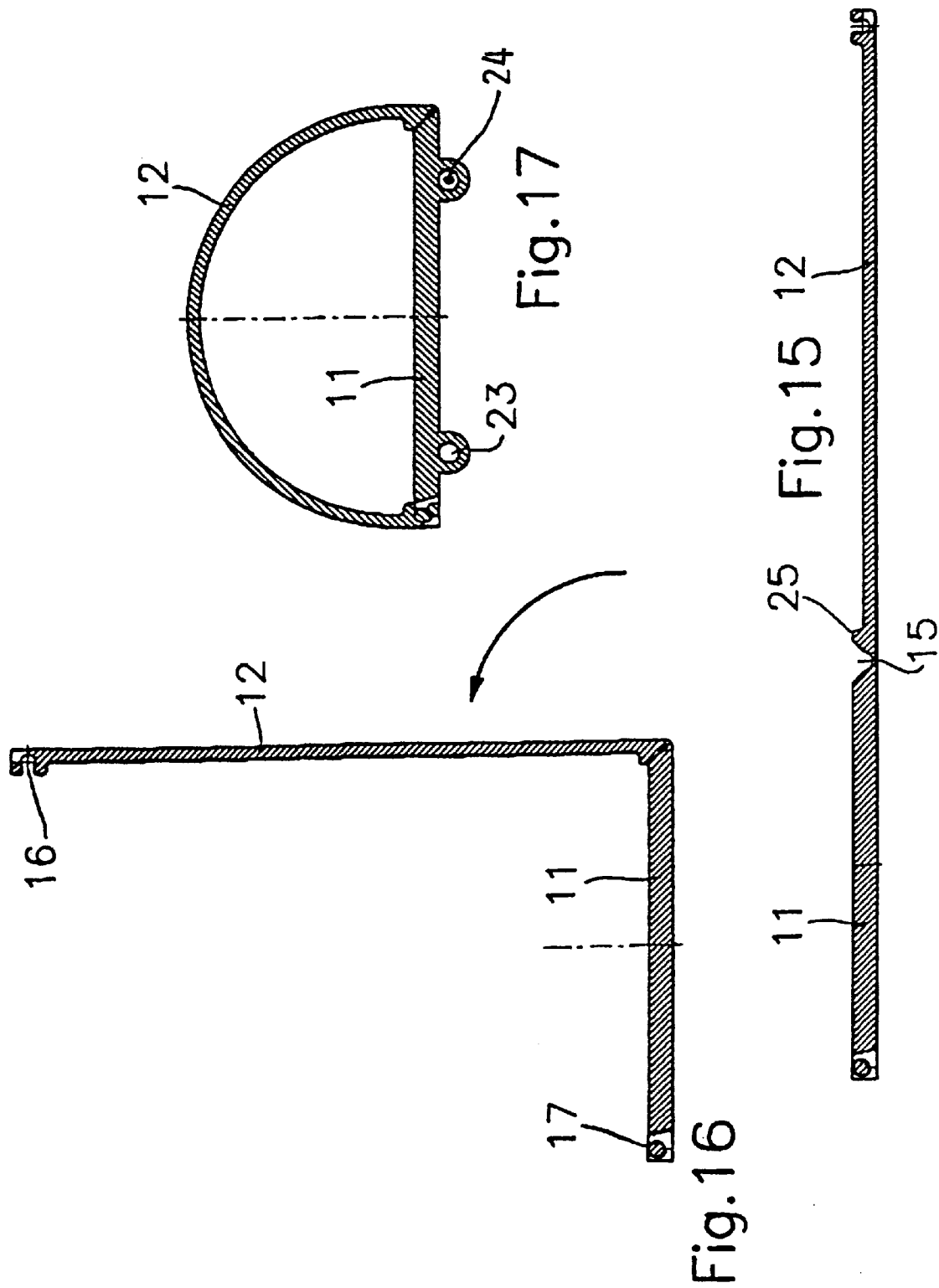

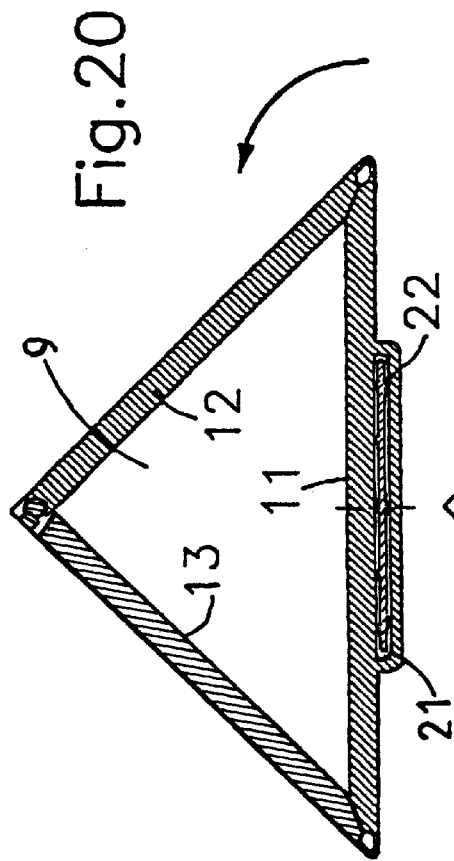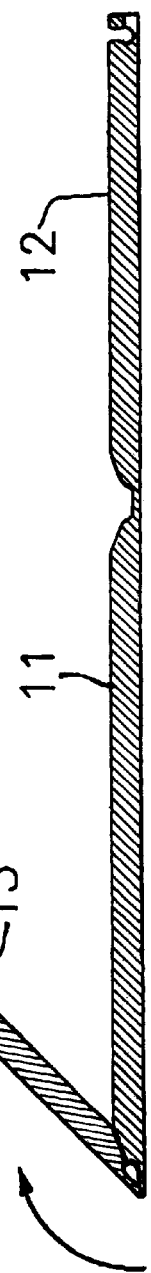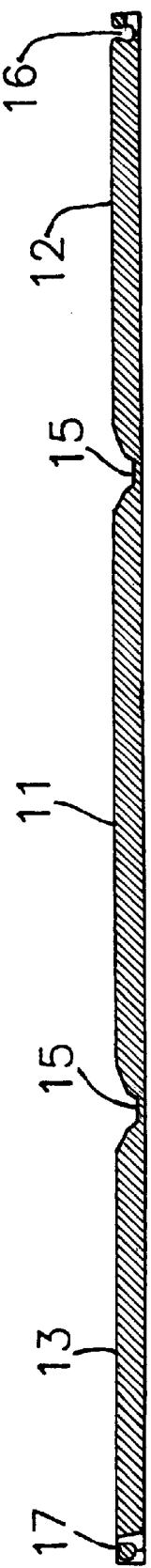

FLEXIBLE ENERGY CONDUCTING GUIDE CHAIN AND PROCESS FOR PRODUCING SAME

BACKGROUND OF THE INVENTION

The present invention concerns a foldable protective element for lines or conduits, which element together with other protective elements can form a protective guide means for cables, hoses and other energy guide lines or conduits. Preferably so-called energy guide chains or energy guide hoses are used to afford protection from mechanical effects and to ensure quite specific paths of movement for energy guide lines or conduits which in particular are not to be excessively curved or indeed bent.

An example of such an energy guide chain is described in EP 0 415 050 B1, the preamble to which also includes further references to the state of the art. DD 265 449 A1 also discloses a so-called cable and hose laying or drag arrangement which performs the same function but which is not composed of individual chain links but is extruded as a closed whole and then processed and in particular slit.

A system which is produced in a similar manner is also described in EP 0 544 027 A1.

It is also known from U.S. Pat. No. 3,473,769 to extrude a flat article which can be shaped to constitute a protective system for lines and conduits by stamping out individual parts and folding together lateral web portions.

Finally EP 0 424 404 B1 discloses an energy guide carrier arrangement which is in the form of a structural unit with lines and connecting adaptors at the ends.

In regard to the known protective systems for lines and conduits, it is possible to discern two ways in which different requirements can be satisfied. One way involves producing chain links which are composed of two or preferably even more parts and which then jointly with other chain links form an energy guide chain which is of a more or less complicated structure, depending on the respective situation of use involved. The other way involves producing integral energy guide systems by a procedure whereby elongate structural parts are extruded and thereafter energy guide systems are produced in a plurality of processing steps by stamping, cutting, bending and the like. In that respect extruded energy guide systems suffer in principle from the disadvantage that variations in cross-section in the extrusion direction are not possible (apart from complete subsequent removal of material) so that it is not possible in that way to produce many desirable mechanical details, in particular connections which are strong and stable in the extrusion direction.

Taking the specified state of the art as its basic starting point, the present invention is based on the problem of providing a foldable protective element for lines, which is inexpensive to produce but which can be substantially freely fashioned in all dimensions. In particular the invention seeks to provide that the protective element can also be formed as part of an integral series of protective elements which in its final form performs the function of the energy guide chains described in accordance with the state of the art.

Another problem of the invention is to provide a process for the production of an integral series comprising a plurality of protective elements while enjoying substantial freedom in terms of the configuration involved and inexpensive manufacture.

SUMMARY OF THE INVENTION

A foldable protective element according to the invention is injection-moulded or cast in one piece from plastic material substantially in an even flat configuration and is made up of segments which are connected together by flexible bridges. In that respect the protective element has a bottom segment with an underside and a top side and at least one wall segment; they can be shaped to form a closed passage portion by bending and/or folding in the direction of the top side of the bottom segment and mechanical closure of a closing mechanism. In that case the protective element is either connected to other similar protective elements or it is of such a configuration that it can be connected to other similar protective elements so that the passage portions form in a longitudinal direction a passage for lines or conduits, in particular for movably laid lines.

The method of manufacture by injection-moulding or casting of plastic material makes it possible to provide a configuration which is complex in all directions, as is known from chain links in the case of energy guide chains. Thus it is possible in particular to produce a closing mechanism which, even with relatively soft plastic material, can be loaded in an axial direction, which is in principle not possible when using extruded shaped portions. Because the protective element is injection-moulded or cast in an approximately even flat configuration, it is possible to produce almost any desired material profiles in respect of all walls of the passage portions, in particular also in regard to the wall segments, which is not possible for example in the case of chain links which are produced in a U-shape.

In the simplest case the protective element can comprise a bottom segment and a wall segment which is formed thereon at one side and which upon assembly is bent to the top side, shaped to form an arc and hooked or latched at the opposite side of the bottom segment by means of a closing mechanism. A passage portion produced in that way, of approximately semicircular cross-section, constitutes the simplest form of a protective element for movably laid lines.

In order to produce an approximately triangular cross-section for the protective element, it can comprise a bottom segment and two wall segments which are either formed at different sides of the bottom segment and which can be connected together by a closing mechanism, or which are both formed in succession on one side of the bottom segment and are put into the desired shape by a double folding operation.

In order to obtain a protective element which is of approximately rectangular cross-section, as is preferred for movably laid lines, the protective element must have a bottom segment, at least two wall segments and a cover segment. They can be formed on the bottom segment in differently distributed ways, as will be described in greater detail with reference to the drawing.

It should be noted that the flexible bridges between the individual segments do not have to be designed for multiple bending to and fro, but only have to be capable of withstanding being folded once in one direction, without suffering damage. It is therefore possible to produce very stable protective elements by virtue of suitable shaping of the bridges, which elements are very similar in terms of their mechanical properties to chain links which are produced directly in a U-shape insofar as ultimately stability of the folded assembly is ensured by the closing mechanism. The closing mechanism is preferably a device for latching engagement, hooking engagement and/or locking engagement, while it is intended to provide in particular a device which is safeguarded against unintentional disengagement under load. Whether the closing mechanism is to be designed to be manually releasable again after it has been closed depends on the respective situation of use involved. In many cases a latching connection which cannot be released again will suffice as the invention is suitable in particular for energy guide systems which are especially inexpensive and in regard to which repair is generally not considered, but rather damaged systems are merely completely replaced. In principle however the invention also permits the use of all kinds of known releasable connections as the closing mechanism, in which respect the mode of manufacture in a even or level, flat configuration even permits additional degrees of freedom in regard to the design configuration of the closing mechanism.

In order to guarantee an exact cross-sectional shape in respect of the passage portions, the individual segments of the protective element can be provided with shaped portions, in particular web portions, projections, openings and the like, to ensure that the element is folded together in an accurate shape. Shaped portions of that kind can additionally enhance the stability of the individual segments insofar as they form reinforcing bracing means.

For energy guide systems, it is also known to provide so-called separating webs which separate different lines within the protective element from each other, permitting the lines to be laid in a defined and careful manner in the interior of the protective system. In accordance with the present invention separating webs of that kind which divide the passage portion to be shaped into two or more partial cross-sectional areas can be formed on at least one of the segments. In that respect such a separating web can either be formed on one of the segments of the protective element in such a way that it already projects approximately perpendicularly out of the plane of the flat configuration upon manufacture thereof, or it can be so formed on one of the segments that it can be later folded into the desired position.

In a particularly preferred embodiment of the protective element according to the invention the bridges connecting the segments together are at least in part toggle joints, that is to say joints which, by virtue of their structural shape, can remain stably in two different positions. Such joints are known for example from the state of the art in relation to plastic closures for bottles. Particularly in regard to use of the arrangement for fixing cover segments to protective elements according to the invention, considerable advantages can be enjoyed, in particular in relation to assembly of the system.

If conventional energy guide chains are to be produced from the protective elements according to the invention, then in accordance with an embodiment of the invention those protective elements must have means for pivotably connecting adjacent protective elements, in particular projections or pins and guide holes or the like. In principle a very large number of embodiments of joints which are known from the state of the art fall to be considered for this purpose, but in particular those in which the individual chain links can be latched together in their final form. It will be appreciated that the invention also affords the possibility of assembling protective elements while still in their flat configuration, prior to their being folded, and then folding them jointly, thereby in turn affording an additional degree of freedom in regard to the design configuration of the joint connections.

Another embodiment of the invention provides that the protective element has guide openings for receiving at least one guide band or guide thread for arranging a large number of protective elements in a row. As will be described in greater detail with reference to the drawing in that way protective elements can be threaded onto a guide band or onto guide threads, thereby forming a simple protective system.

It is particularly important in many cases in relation to protective elements for movably laid lines that the curvature of the lines is not less than given predetermined radii of curvature. In a preferred embodiment therefore a protective element according to the invention has means for limiting the angle through which it can be angled in the longitudinal direction relative to an adjacent protective element. Such so-called curvature radius limiters are known in many different forms from the state of the art. This may involve a specific configuration in respect of the joints to adjacent protective elements, or it may involve web portions which, at a given angle, abut against corresponding web portions of adjacent protective elements and prevent further bending.

One of the most important aspects of the present invention, and a preferred embodiment, is that a plurality of protective elements are integrally produced in the form of a series or row of protective elements, with in particular the bottom segments being joined together. For small and in particular short line guide systems, in particular of a length of from 20 to 150 cm, it can be highly advantageous in terms of cost for the complete system to be produced in a single production step. It is precisely in the case of chains comprising very small chain links that the level of assembly expenditure is considerable and complicated and very precise machines are required to assemble such chains from a plurality of components. It is here that integral manufacture affords crucial advantages in regard to costs, but also in relation to technical options of use, as will be described hereinafter.

In the case of an integral series of protective elements according to the invention, the bottom segments can preferably together form a continuous flexible bottom surface of uniform material thickness, whereby the advantages of extruded energy guide systems can be combined with those of energy guide chains. However, for some situations of use, it may also be advantageous if the bottom segments of an integral series of protective elements are connected together by elastic flexural regions, in particular by portions involving a smaller thickness of material and/or of smaller width than that of the bottom segments. Those flexible portions then perform the function of joints, but, like the integral arrangement, they afford the advantage that no parts rub against each other so that no abrasion wear occurs and there are also no tolerances which will change due to wear. That can be a matter of great advantage for small-scale precision systems and use in clean rooms in which abrasion wear is undesirable.

In the case of integral series of protective elements according to the invention, it is possible to use therein the means for limiting the radius of curvature, which are known from the state of the art. In particular it is possible to dispose at the underside on each bottom segment web portions which co-operate with adjacent web portions in such a way that the series of protective elements can only be bent as far as a predetermined minimum radius of curvature, towards the underside. Those web portions can extend in the longitudinal direction and can have end surfaces which are bevelled to correspond to the desired angle relative to the adjacent element. Another alternative provides that the web portions extend transversely to the longitudinal direction and have correspondingly bevelled side surfaces.

In the case of energy guide systems with a minimum radius of curvature which is limited towards a side, it is frequently desirable for those systems to be allowed to move towards the top side, at a maximum only as far as a straight line. In that way energy guide systems can themselves serve as a load-bearing structure for lines or conduits, in which respect it is desirable to afford a so-called self-supporting length which is as long as possible. As the weight of the lines to be guided and of the guide system itself results in sagging when relatively long self-supporting lengths are involved, it is even sometimes desirable for the energy guide system to be so designed that, without the application of force thereto, it cannot be entirely stretched out straight so that, when long self-supporting lengths are involved, the system first adopts a straight configuration due to the weight of the system, with a certain degree of elastic deformation occurring. Energy guide systems which can adopt a straight shape only under the application of a force are also referred to as "prestressed" systems. That cannot be achieved in a simple manner with extruded energy guide systems as curved profile portions would have to be extruded for that purpose, and that can only be achieved with difficulty in a definedly reproducible fashion. The shape required for a prestressing configuration can never be produced by subsequent stamping or slitting.

In comparison, with the present invention it is possible also to produce integral rows of protective elements with any prestressing effect. For that purpose it is only necessary for the wall and/or cover segments not to be formed all on one side of the bottom segments, but alternately on both sides. In that way there is enough space that the wall segments but in particular the cover segments can be produced to be of greater overall length than the overall length of the bottom segments, thereby precisely affording the prestressing effect. That arrangement also gives the advantage that separating webs can be formed on the wall and/or cover segments.

A quite particular advantage of an integrally produced series of protective elements is also that, in accordance with a preferred embodiment of the present invention, an end portion can be formed thereon at at least one end, which end portion serves for fixing and/or receiving connecting means for lines. In the case of chains which are produced from individual chain links, it is in many cases necessary to produce special end portions, and that requires corresponding expenditure in regard to tools and logistics. End members which are formed on the assembly, for energy guide systems which are required in large numbers, are therefore particularly desirable. That effect is further enhanced by virtue of the fact that the end portions not only have holes or specific shapes for fixing to other components, but they are shaped or moulded directly as receiving means for connecting means of lines. It is possible in particular for the end portion to be provided with pre-shaped receiving means for electrical and/or pneumatic and/or hydraulic plug connections, as will be described in greater detail by way of example with reference to the drawing. An integral series of protective elements of that kind, with pre-shaped end portions, can be very easily assembled with lines to form a complete modular system, in particular in a mass-production situation.

A further option in accordance with the invention for the production of an integral series of protective elements provides that protective elements are injection-moulded or cast at predetermined spacings onto at least one band or onto two or more threads. In that respect it is also possible for a plurality of protective elements to be respectively cast simultaneously onto a band or onto threads. That results in a belt-like system which can combine many advantageous properties of extruded energy guide systems and energy guide chains. In particular it is possible to produce any lengths, while nonetheless retaining the integral nature of the structure. In that respect the bendability and load-bearing capacity of the system can be influenced by the choice of the band or threads and by the spacings between the protective elements. In principle in that respect it is possible to use different materials for the band or the threads, and the protective elements. It is however also possible to produce both from the same material.

Another process according to the invention which is a particularly preferred embodiment involves the production of an integral series of protective elements of predetermined length in a single casting or injection-moulding mould. In comparison with increased tooling costs for that one mould, the costs for injection moulding machines, assembly and assembly tools are considerably lower as there is only a single component that has to be handled and folded, while in the case of energy guide chains which are formed from chain links many components have to be handled and in the case of extruded systems numerous finishing working steps are required.

That applies in particular if the end portions are already formed on the elements, as is preferably provided with the present invention.

The advantages of the invention are particularly apparent when series of protective elements with lines already laid therein and connections integrated into end portions are to be produced in relatively large numbers of for example more than 100,000 items per year. In accordance with the invention that is easily possible by virtue of production of the series of protective elements with end portions formed thereon, in a mould, in which case the lines are then laid therein and the connecting plugs and/or connecting sockets are fixed in pre-shaped receiving means in the end portions. The system is finished by folding and closing the closing mechanisms of the individual protective elements.

BRIEF DESCRIPTION OF THE DRAWINGS

Advantages and preferred embodiments of the invention to which however it is not limited are described hereinafter with reference to the drawings in which:

FIG. 1 is a side view of an integral series of protective elements according to the invention, with end portions, FIG. 2 is a view in cross-section through a single protective element of said series in the non-folded condition, FIG. 3 is a view from above onto a broken-away part of the series of protective elements in the non-folded condition, FIG. 8 is a diagrammatic view of the structure of a protective element in cross-section in the non-folded position, FIGS. 9, 10 and 11 are views in cross-section showing the individual steps involved in folding together the protective element shown in FIG. 8, FIGS. 12, 13 and 14 show a closing mechanism for protective elements in the opened and closed conditions respectively, FIGS. 15, 16 and 17 are views in cross-section of another embodiment of a protective element in a non-folded, partially folded and closed condition, FIGS. 18, 19 and 20 are views in cross-section of a further embodiment of a protective element in the extended, partially folded and closed condition.

DETAILED DESCRIPTION OF THE PREFERRED EMBODIMENTS

Figure 4:
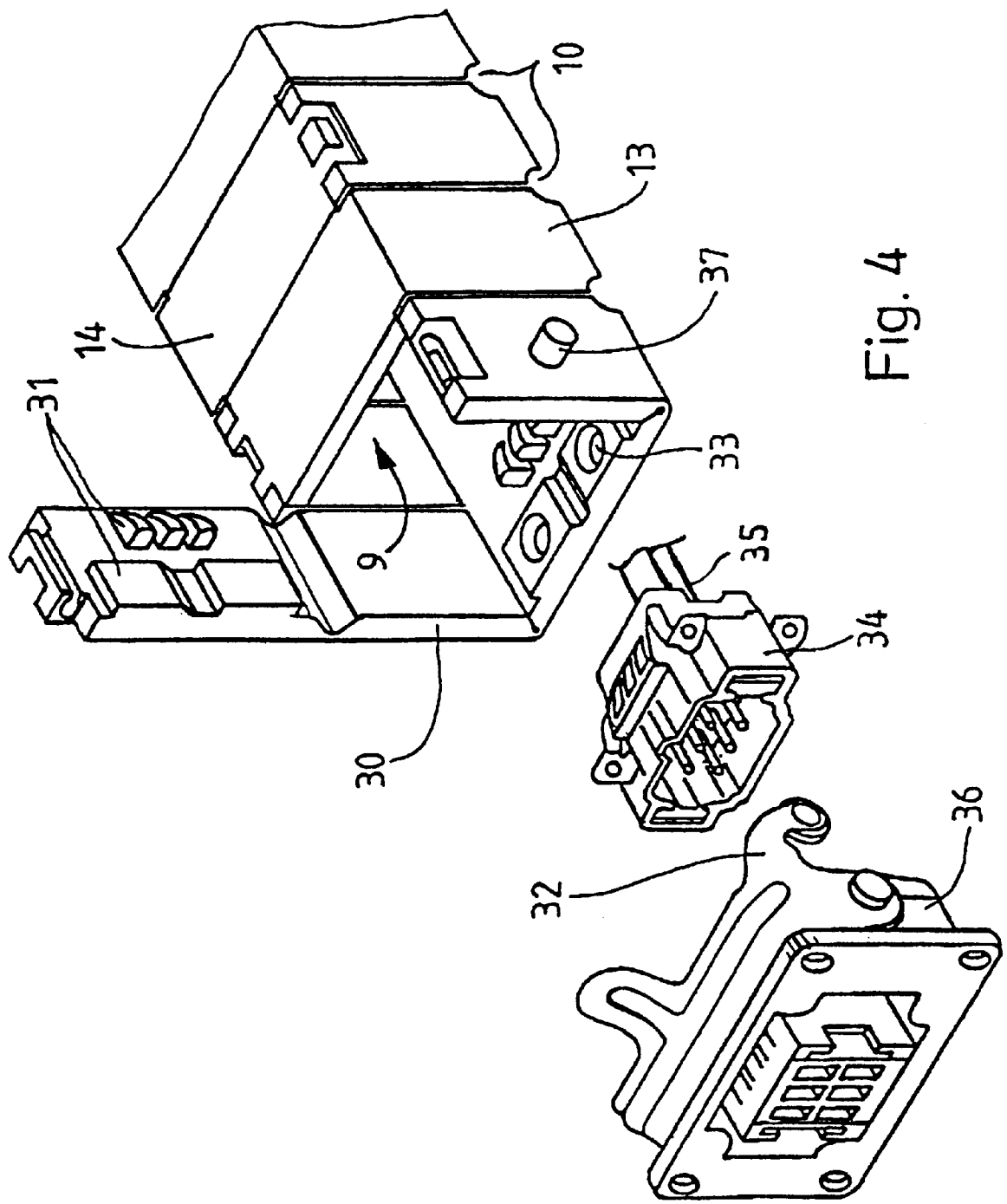
FIG. 4 is a diagrammatic exploded view of the end region of a series of protective elements with plug insert and connecting adaptor.

FIG. 1 is a diagrammatic side view of one of the particularly preferred embodiments of the present invention, more specifically a series of protective elements cast or injection-moulded in one piece, comprising protective elements 1 which are integrally connected together and which form passage portions 10. At their underside they have web portions 2 with bevelled end surfaces 3 which, when adjacent protective elements are angled, ensure that the series or row of protective elements cannot adopt a curvature which is less than a minimum radius R of curvature, towards their underside. Integrally formed on the series of protective elements are end portions 30 which can be fixed to suitable connecting adaptors 36 for example by means of a locking mechanism 32 which engages into a locking projection or pin 37.

As can be clearly seen with reference to FIGS. 2 and 3 in a cross-sectional view and in a plan view respectively, the individual protective elements of the series of protective elements are produced by folding together a continuous plastic structure which was originally produced in approximately flat extended shape. Each protective element 1 has a bottom segment 11, two wall segments 12, 13 and a cover segment 14 which are connected together by means of bendable bridges 15. The bendable bridges 15 are of a smaller material thickness than the other segments and in regard to their boundaries are of such a shape that, when the element is folded together, the result is a stable passage 9 which is of rectangular cross-section, for each protective element 1. The folding operation takes place towards the top side 4 of the bottom segment 11, while a closing mechanism 16, 17 permits the mutually contacting ends of a wall segment 12 and the cover segment 14 to be connected together. Various configurations which are known from the state of the art in relation to energy guide chains can be considered for the closing mechanism 16, 17, in particular hooks, latching means, positively locking engagement means and in particular snap connections which involve a resilient snapping engagement. The present embodiments illustrate a snap connection of that kind, in which a rounded spindle or shaft portion 17 snaps into a recess 16.

In the embodiments of series of protective elements illustrated in the drawing the bottom segments 11 are connected together. In that respect, in the simplest case, they can form a guide path which is of uniform material thickness throughout and which can be relatively uniformly curved to give a minimum radius of curvature. In order to increase the flexibility of a series of protective elements however it is also possible to provide between the individual bottom segments 11 elastic flexural regions 8 which involve a thinner thickness of material and/or a smaller width of material, than the rest of the bottom segments 11.

In order clearly to show the advantages of the series of protective elements according to the invention, FIG. 4 is a perspective view of the end of a series of protective elements, with the cover segment 14 of the end portion 30 being shown in the open condition. That end portion 30 is provided with fixing holes 33, by means of which it can be screwed to a structure. In addition it has receiving means 31 which are specifically adapted in respect of their shape and which permit a plug insert 34 to be securely held in position in positively locking relationship. In that way a prefabricated line run with plug inserts 34 at the end can be simply laid in position in a series of protective elements whilst still in the open condition, and fixed by closing the cover segments 14 of the end portions 30. That results in a series of protective elements of modular structure, with fixedly installed lines, which series can be fixed with the end portions 30 thereof to connecting adaptors 36. A locking mechanism 32, co-operating with locking projections or pins 37 on the end portions 30, permits the series of protective elements to be securely fixed in place.

Figure 7:
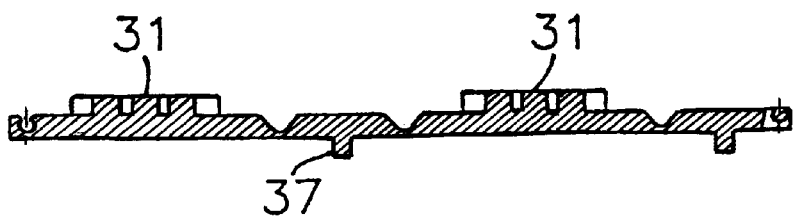
FIG. 7 is a view in cross-section through an end portion of the series of protective elements in FIG. 5.
Figure 6:
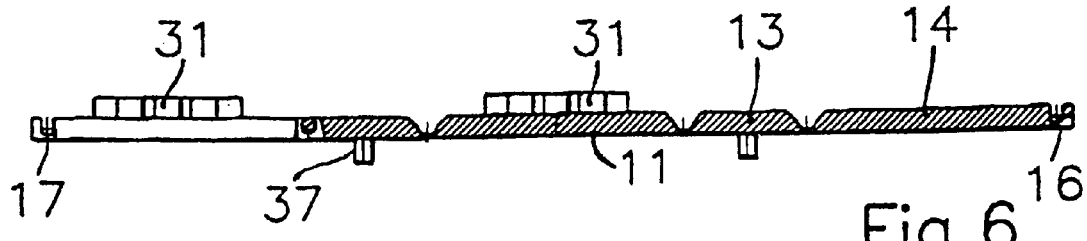
FIG. 6 is a view in cross-section through the series of protective elements in FIG. 5 in the region of the penultimate protective element.
Figure 5:
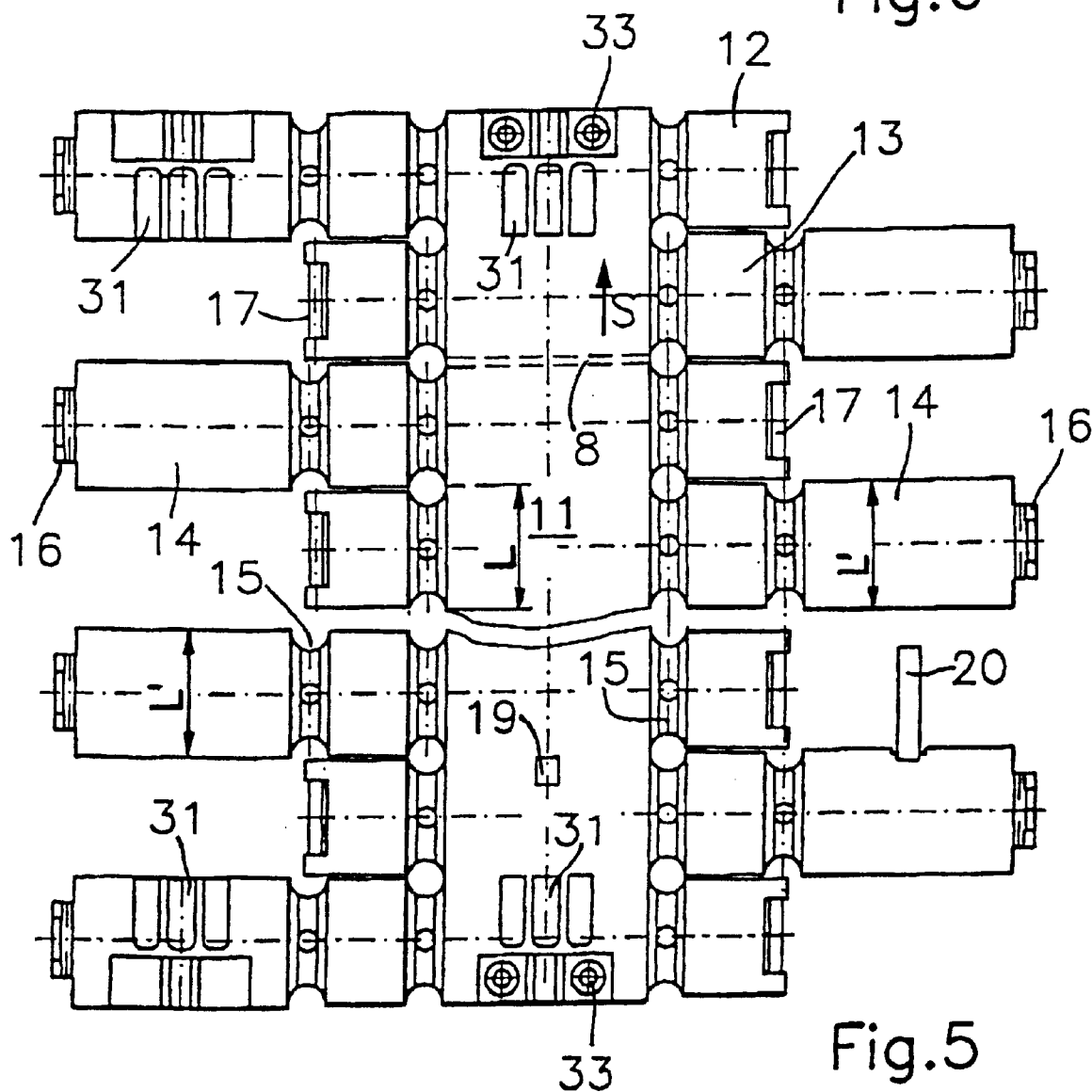
FIG. 5 is a view from above onto a non-folded series of protective elements with end portions.

The principle involved in production of the series of protective elements illustrated in FIG. 4 is also illustrated once again with reference to FIGS. 5, 6 and 7. FIG. 5 is a view from above showing the structure of such a series of protective elements, in the non-folded position, FIG. 6 is a view in cross-section through the penultimate protective element and FIG. 7 is a view in cross-section through the end portion of the series of protective elements illustrated in FIG. 5. The reference numerals used correspond to those employed in the previous Figures so that the series of protective elements is made up of bottom segments 11, wall segments 12, 13 and cover segments 14. The longitudinal direction is indicated by an arrow S in FIG. 5. FIG. 5 shows that the cover segments 14 are arranged alternately on both sides of the series of protective elements in the non-folded condition, which affords a crucial advantage in terms of dimensions. The alternate arrangement means that there is sufficient space for the cover segments 14 that they can be of an extent L' in the longitudinal direction S, which is greater than the extent L of the individual bottom segments 11 in the longitudinal direction S. The prestressing of the series of protective elements, that is to say the force which is required to put the series of protective elements into an exactly straight orientation, can be determined in accordance with the respective amount by which the length L' of the cover segments 14 exceeds the length L of the bottom segments 11; that prestressing effect determines the attainable self-supporting lengths of such series of protective elements and makes it possible to influence the degree of sag when dealing with particularly long self-supporting lengths. In principle, besides being achieved by virtue of the dimensioning of the cover segments 14, the prestressing effect could also be achieved by a suitable configuration in respect of wall segments 12, 13 which are arranged on alternate sides, by virtue of those wall segments being of a slightly trapezoidal configuration. The simplest and most stable embodiment however is to be achieved by virtue of suitable dimensioning of the cover segments 14.

An additional configuration is diagrammatically illustrated as a further particular feature in FIG. 5. This involves a separating web 20 which is formed on a cover segment 14 and which can be folded out of the plane in which it is produced in such a way that, when the protective elements are folded together, the separating web 20 engages into a separating web-receiving means 19 and, securely fixed in that way, subdivides the free cross-section of a protective element 1. In principle, separating webs could also be cast or injection-moulded when already in an orientation in perpendicular relationship to the plane of the individual segments, in the course of production of the protective elements, whereby additional folding into the desired position would no longer be required.

FIGS. 8, 9, 10, 11, 12, 13 and 14 once again show in detail in cross-section a protective element in its plane in which it is produced and in different conditions in the course of being folded together. The individual parts are denoted by the same references as in the preceding Figures.

A protective element of a particularly simple structure is shown in cross-section in FIGS. 15, 16 and 17, more specifically in the condition in which it is produced, in a partially folded condition and in the closed final form thereof. In this embodiment the protective element has only a bottom segment 11 and a wall segment 12 which are connected by a bendable bridge 15. A shaped portion 25 provides for correct positioning when the parts are folded together and the flexible wall segment 12 can be put into a semicircular shape and locked to the bottom segment 11 to constitute a closed shape, by means of a closing mechanism 16, 17. When the wall segment 12 is at least partially resiliently deformed in that way, in particular hooking engagement into an opening in the bottom segment 11 is also suitable as the closing mechanism, in which case the hook can be held by the resilient force in a suitable opening in the bottom segment 11.

FIG. 17 additionally shows in diagrammatic form guide openings 23 at the underside of the bottom segment 11 for receiving guide threads 24 (not shown). A large number of protective elements can be threaded onto guide threads 24 by means of such guide openings 23, thereby producing a simple row or series of protective elements. It will be appreciated that with this embodiment also such a series of protective elements can equally well be produced by production of a series of elements in one piece, as described above.

FIGS. 18, 19 and 20 are views in cross-section of a further embodiment of the invention, once again in the extended, partially folded and completely folded form. In this embodiment each protective element has a bottom segment 11 and two wall segments 12, 13 which, in the folded-together condition, form a triangular passage portion 10. A locking mechanism 16, 17 can again be of such a configuration, according to the loadings that occur, that unintentional opening of the element under load is not possible.

FIG. 20 additionally shows an embodiment for a guide opening 21 for a guide band 22. By virtue of that arrangement, in the event that a series of protective elements is not to be produced in one piece, it is possible for many protective elements to be threaded onto a guide band. Such a guide band can also comprise for example spring steel, whereby it is possible to achieve particular properties in respect of the series of protective elements and a high degree of durability. Other materials can also be considered for the guide band 22.

Figure 23:
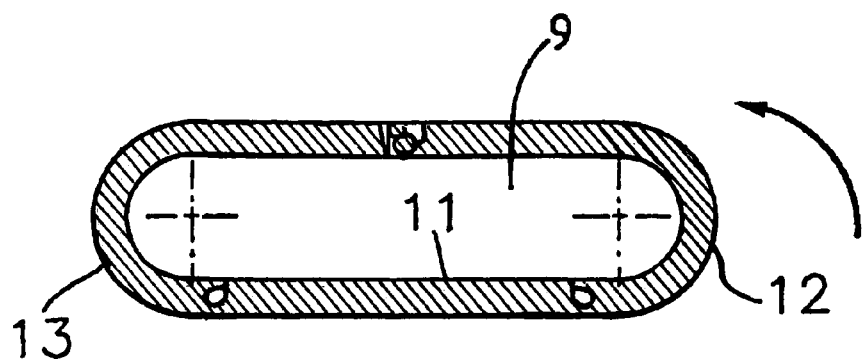
FIGS. 21, 22 and 23 are views in cross-section of a further embodiment of a protective element in the non-folded, partially folded and closed condition.
Figure 22:
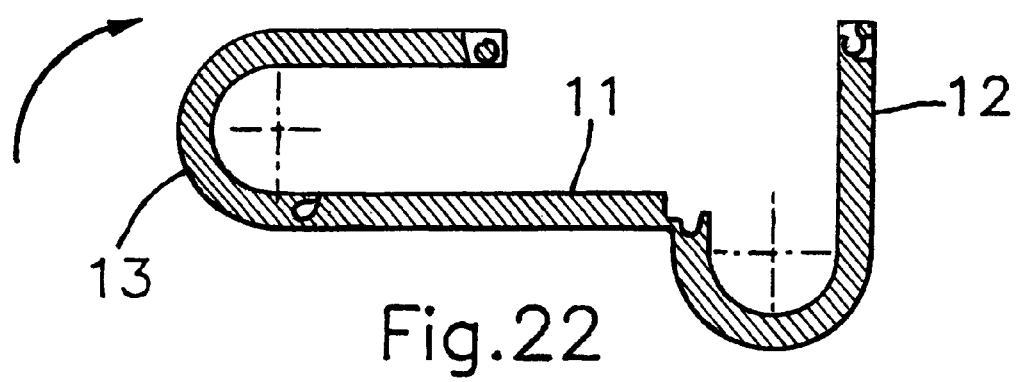
Figure 21:
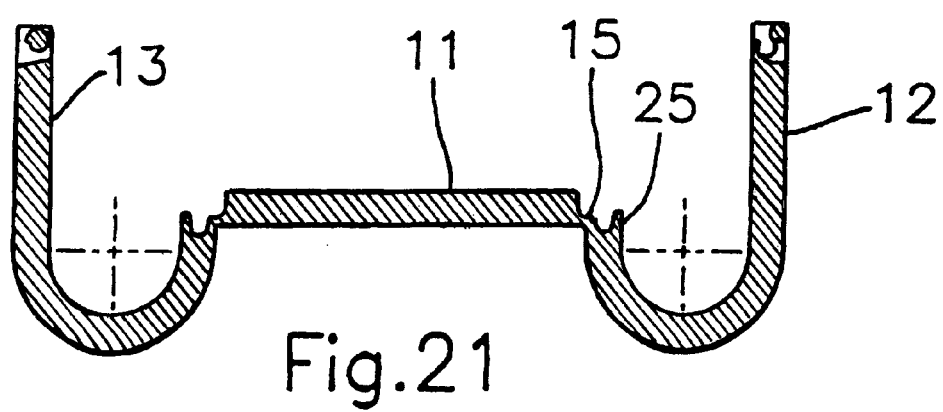

FIGS. 21, 22 and 23 are views in cross-section of a further embodiment of the invention, once again in the non-folded, partially folded and closed condition. In this embodiment the wall segments 12 are of a curved or bent shape so that they can simultaneously also perform the function of a cover segment. This embodiment also shows that the expression a flat, substantially level configuration can nonetheless also be used to denote more complex shapes which however are mainly of such a configuration that, apart from given particular features, they can essentially be produced by moulding from two half-shell portions.

Figure 24:
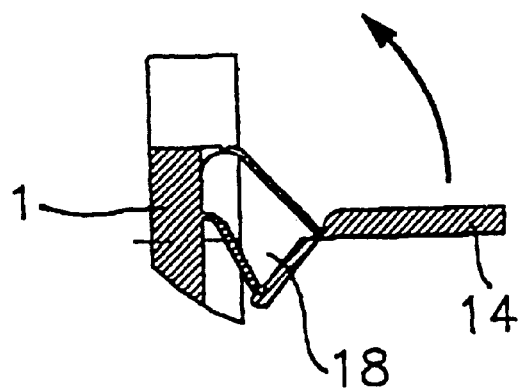
FIGS. 24, 25 and 26 shows an example of a toggle joint in the opened, half-closed and closed condition.
Figure 25:
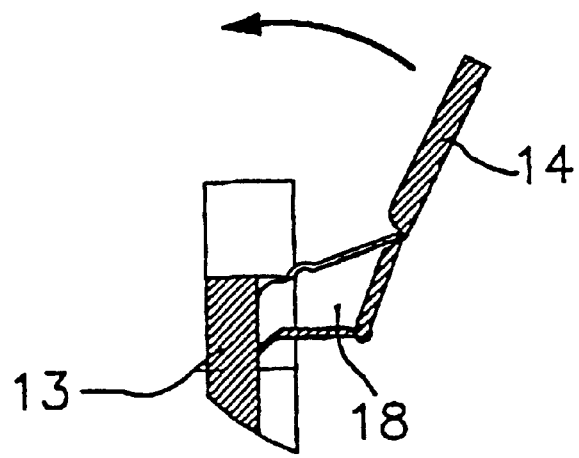
Figure 26:
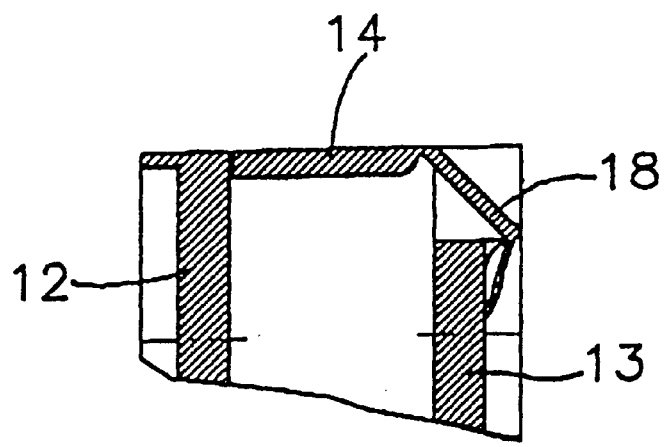

FIGS. 24, 25 and 26 show a particular embodiment in which a toggle joint 18 can be arranged between two segments, instead of the bendable bridge 15. Such toggle joints 18 have the particular characteristics that they can remain in a stable fashion in two positions, by virtue of the configuration and dimensioning of two or three plastic leg portions. Thus a cover segment 14 which is pivotably connected to a wall segment 13 by a toggle joint 18 can remain stably in the position shown in FIG. 24. After a movement which occurs against a resistance, in the direction indicated by the arrow in FIG. 25, the cover segment 14 can then stop in a stable condition in a second position, as shown in FIG. 26, or can bear under spring pressure against a support means. Toggle joints of that kind can in principle be used at various locations in place of the above-described bendable bridges 15, but they can be used in particular for the pivotal connection of the cover segments 14. They are also suitable for the cover portions of non-foldable chain links of energy guide chains.

Figure 27:
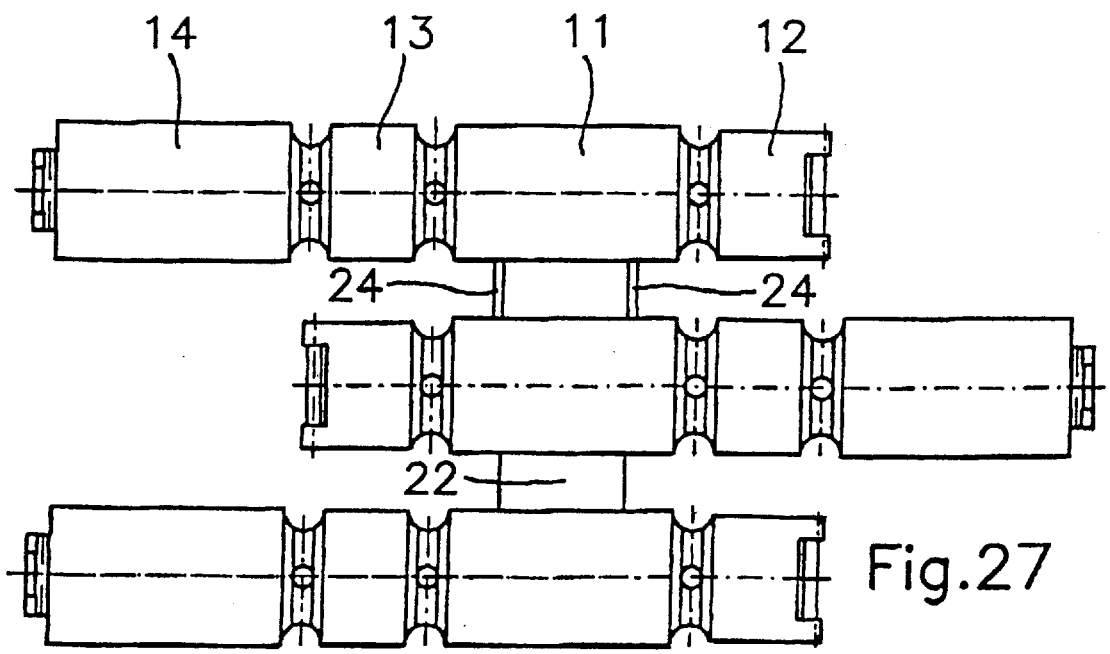
FIG. 27 is a diagrammatic view of an embodiment of a series of protective elements with a guide band or two guide threads.

FIG. 27 is a diagrammatic view showing how a series of protective elements, comprising individual protective elements 11, can be injection-moulded onto a guide band 22 or two guide threads 24. Modern injection moulding machines make it possible for a guide band 22 or guide threads 24 of any length to be passed through the injection moulding moulds and for one or more protective elements to be injection-moulded with their bottom segments 11 at respective predetermined spacings from each other onto those parts which pass through the moulds. In that respect the materials of the bottom segments 11 and the guide band 22 or the guide threads 24 may be the same or different. In that way it is possible to produce particularly flexible and durable series of protective elements. This mode of manufacture is in principle also possible with non-foldable protective elements.

Figure 28:
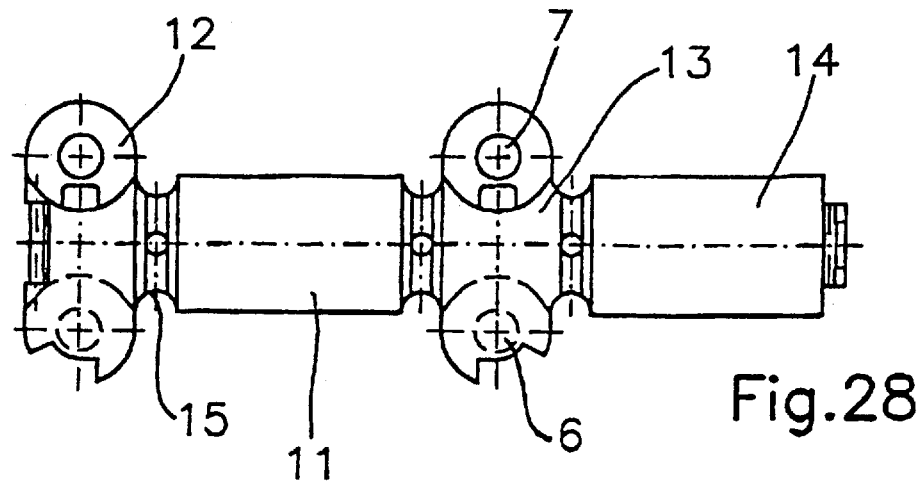
FIG. 28 is a view from above onto a single foldable protective element in the form of a chain link.

As the last embodiment, FIG. 28 shows that the present invention is also suitable for the production of chain links as are known per se for the construction of energy guide chains. As diagrammatically indicated an energy guide chain link can also be produced by folding from a bottom segment 11, a wall segment 12 and a wall segment 13 with a cover segment 14 attached thereto. Except for the bendable bridges 15, a chain link which is produced by folding does not need to be distinguished from other known structural shapes so that it is also possible to use all connecting procedures and ways of limiting the radius of curvature, which are known in relation thereto. It will be noted that an additional degree of freedom is enjoyed in terms of the design configuration by virtue of the fact that, in production in a substantially flat mould, it is possible to produce one-piece chain links which nevertheless may have any desired structures at the inward and outward sides. This is otherwise only possible with extremely complicated injection moulding moulds, in relation to one-piece or U-shaped chain links. There is also the further advantage that the joints, of whatever configuration they may be, do not necessarily first have to be assembled in the folded condition of the chain link, but can also already be fitted together while the element is still in its extended shape. This makes it possible to adopt structural shapes, for example long pins 6 in guide holes 7, which could not be assembled at all when dealing with one-piece chain links which are already produced in their final form.

Therefore by virtue of the concept of the injection-moulded or cast foldable protective element the present invention permits numerous technically advantageous structural shapes, which are inexpensive to produce, for protective systems for movable and non-movable lines or conduits, which could not be produced using conventional processes. In particular it is possible in that way to produce small inexpensive line guide systems in large numbers, which permits them to be used in areas in which hitherto such systems could only be used with difficulty, for example in small desk-top printers, manipulators and small-scale machines.

What is claimed is:

1. A foldable protective element for forming a flexible guide chain adapted for supporting energy conduits from an attachment point to a moveable consuming load, comprising
    a generally flat body member which is formed in one piece by molding or casting a plastic material so as to define a plurality of segments extending serially in a transverse direction and joined to each other by means of a deformable bridge between adjacent segments which permits the adjacent segments to be foldable with respect to each other and so that the body member may be configured to form a closed passage which extends in a longitudinal direction which is perpendicular to said transverse direction, and a mechanical closure for retaining the body member in said form of a closed passage.

2. The foldable protective element as defined in claim 1 wherein the plurality of segments include a bottom segment and two wall segments joined to said bottom segment at transversely opposite ends thereof.

3. The foldable protective element as defined in claim 2 wherein said plurality of segments further includes a cover segment joined to one of said wall segments at the end thereof opposite said bottom segment, and wherein the segments may be folded into a rectangular closed passage.

4. The foldable protective element as defined in claim 3 wherein said mechanical closure comprises a releasable connection between said cover segment and the wall segment other than said one wall segment.

5. The foldable protective element as defined in claim 3 wherein the deformable bridge between the cover segment and the one wall segment comprises a toggle joint which is configured to remain stable in an open position and in a closed position.

6. The foldable protective element as defined in claim 4 further comprising means for pivotally connecting the body member when in said form of a closed passage to another like body member for relative pivotal movement about an axis extending parallel to the transverse direction.

7. The foldable protective element as defined in claim 6 wherein the pivotal connecting means comprises a pin and a guide hole formed on each wall segment, with the guide hole being sized for receiving a pin on an adjacent body member.

8. The foldable protective element as defined in claim 1 wherein each deformable bridge includes a shaped portion configured to insure that when folded the adjacent segments assume a predetermined shape.

9. The foldable protective element as defined in claim 1 wherein the body member of at least some of the protective elements further comprises at least one separating web which is adapted to be positioned so as to subdivide the closed passage.

10. A flexible guide chain for supporting energy conduits from an attachment point to a movable consuming load, comprising
    a plurality of protective elements, with each protective element comprising a generally flat body member which is formed in one piece by molding or casting a plastic material so as to define a bottom segment having opposite ends which define a transverse direction therebetween and opposite sides which define a longitudinal direction therebetween, a pair of wall segments joined to respective ends of the bottom segment by means of a deformable bridge so as to extend therefrom in the transverse direction and define a remote end spaced from said bottom segment, and a cover segment joined to the remote end of one of the wall segments by means of a deformable bridge so as to extend therefrom in the transverse direction, wherein the segments may be folded from said flat configuration to form a rectangular closed passage, and a mechanical closure for retaining the segments in said form of a rectangular closed passage,
    said plurality of protective elements being serially arranged in the longitudinal direction with the bottom segments of adjacent protective elements being longitudinally aligned and flexibly interconnected, and so that in the longitudinal direction the closed passages of the protective elements form a duct for supporting energy conduits.

11. The flexible guide chain as defined in claim 10 wherein the mechanical closure comprises a releasable latch joined between the cover segment and the opposite wall segment.

12. The flexible guide chain as defined in claim 10 wherein the bottom segments of adjacent protective elements are flexibly interconnected by means of a guide opening formed on the bottom segments and a guide member received in the guide opening so as to string the protective elements together.

13. The flexible guide chain as defined in claim 10 wherein the bottom segments of adjacent protective elements are flexibly interconnected directly to each other along the adjacent sides by means of a resilient flexural region.

14. The flexible guide chain as defined in claim 10 wherein the bottom segment of each protective element includes a web portion having beveled surfaces which engage corresponding surfaces of adjacent protective elements when the protective elements are flexed and so as to limit the flexure.

15. The flexible guide chain as defined in claim 14 wherein the web portion of each protective element extends in the longitudinal direction and the beveled surfaces are positioned on the ends of the web portion.

16. The flexible guide chain as defined in claim 10 wherein adjacent protective elements are oppositely oriented so that the cover segments of adjacent protective elements extend in opposite transverse directions from the wall segments to which they are joined.

17. The flexible guide chain as defined in claim 16 wherein the cover segments have a longitudinal dimension which is greater than the longitudinal dimension of the bottom segments, so as to provide for a prestressing of the protective elements when placed in a straight longitudinal direction.

18. The flexible guide chain as defined in claim 10 further comprising an end portion joined to one longitudinal end of the plurality of protective elements which is configured to engage and fix energy conduits.

19. A process for producing a foldable protective element useful for forming a flexible guide chain adapted for supporting energy conduits from an attachment point to a moveable consuming load, comprising the steps of molding or casting a plastic material to form a generally flat one piece body member which includes a plurality of segments extending serially in a transverse direction and joined to each other by means of a deformable bridge between adjacent segments, folding the adjacent segments with respect to each other at the deformable bridge and so that the body member is configured to form a closed passage which extends in a longitudinal direction which is perpendicular to said transverse direction, and wherein said molding or casting step includes forming a mechanical closure integral with the body member for retaining the body member in said form of a closed passage.

20. The process as defined in claim 19 wherein the molding or casting step includes the further step of molding or casting the plastic material onto at least one guide band or thread which extends in the longitudinal direction.

21. The process as defined in claim 19 wherein the molding or casting step includes concurrently molding or casting a plurality of said body members, with the bottom segments of said plurality of body members being serially arranged in the longitudinal direction with the bottom segments of adjacent body members being longitudinally aligned and flexibly interconnected, and so that in the longitudinal direction the closed passages of the protective elements form a duct for supporting energy conduits.

22. The process as defined in claim 21 wherein the molding or casting step includes concurrently forming at least one end portion on the serially arranged plurality of body members, with the end portion being configured for mounting a plug insert which is mounted on an energy conduit.

23. The process as defined in claim 22 wherein after the molding or casting step and prior to the folding step, at least one energy conduit having a plug insert mounted thereon is run longitudinally along the serially arranged body members, with the plug insert being received in the end portion.

* * * * *